United States Patent [19]

Dimmick et al.

[11] 4,129,087
[45] Dec. 12, 1978

[54] COMBINATION PURSUIT AND COMPENSATORY DISPLAY SYSTEM

[75] Inventors: Joseph G. Dimmick; William J. Weingartner, both of Annapolis; Alan S. Fields, Silver Spring; Donald L. Fairhead, Annapolis; Rosemary Musson, Millersville, all of Md.

[73] Assignee: The United States of America as represented by the Secretary of the Navy, Washington, D.C.

[21] Appl. No.: 826,019

[22] Filed: Aug. 19, 1977

[51] Int. Cl.² ............................................. B63H 25/04
[52] U.S. Cl. .............................. 114/144 E; 73/178 R; 116/129 T; 116/DIG. 43; 364/457
[58] Field of Search ............. 73/1 E, 507, 513, 178 R; 116/26, 129 R, 129 T, 133, 134, 136.5, DIG. 37, DIG. 43; 114/144; 318/561, 588, 591; 340/27, 29, 109, 324 R, 324 A, 366 F, 30, 73; 364/457

[56] References Cited

U.S. PATENT DOCUMENTS

| 1,639,885 | 8/1927 | Gammeter | 116/133 |
| 3,355,806 | 12/1967 | Brook | 73/1 E |
| 3,603,775 | 9/1971 | Galloway et al. | 364/457 X |
| 3,665,281 | 5/1972 | Hirokawa | 114/144 RE X |

FOREIGN PATENT DOCUMENTS

| 25555862 | 6/1976 | Fed. Rep. of Germany | 318/588 |
| 1250466 | 10/1971 | United Kingdom | 116/129 T |
| 432041 | 5/1975 | U.S.S.R. | 114/144 E |

Primary Examiner—Stephen G. Kunin
Attorney, Agent, or Firm—R. S. Sciascia; Q. E. Hodges

[57] ABSTRACT

This invention is a display system to assist a human operator in manually controlling a ship. This system may be operated in a conventional autopilot mode, where the system controls the ship completely; in a conventional hand electric mode, where the helsman manually controls the ship unaided by the system; and in a third mode, where the autopilot provides the helmsman all the information needed to steer the ship properly while the helmsman maintains direct manual control over the ship. In addition to the usual displays such as a rudder angle indicator and a compass repeater, the system provides a display which shows both the actual angle of the helm wheel and optimum angle for the helm wheel calculated by the autopilot.

17 Claims, 3 Drawing Figures

COMBINATION PURSUIT AND COMPENSATORY DISPLAY SYSTEM

The invention described herein may be manufactured and used by or for the Government of the United States of America for governmental purposes without the payment of any royalties thereon or therefor.

BACKGROUND OF THE INVENTION

In a man machine control system the task of the human operator is continually to decide upon and make control adjustments on the basis of his sensory perceptions to insure that the output of the system remains appropriate to the inputs. In applications where it is not feasible to entirely replace the man by a automatic controller, a common design goal is to ensure that the transfer function required of the man is mathematically always as simple as possible. For steering control of ships it is not feasible to eliminate the human operator from the continuous control loop under all circumstances. Displays presently and previously in use for ship steering control have not met the design goal of simplifying the transfer function required of the human operator. Part of the reason has been the lack of a suitable display system.

The helmsman of a ship typically has his choice of two modes of steering control: hand electric or autopilot. When the autopilot mode is selected, the ship is steered automatically by the autopilot which determines the error between ordered and actual heading and outputs an appropriate signal corresponding to an ordered rudder position. The task of the helmsman is to adjust the ordered heading as necessary and to monitor the operation of the autopilot to determine if it is working properly. Displays typically available consist of a compass, a helm angle (ordered rudder angle) indicator and an actual rudder angle indicator. The autopilot solves the differential equations necessary to determine the appropriate helm angle. In the most conventional autopilot systems the helmsman cannot modify the helm angle ordered by the autopilot without turning the autopilot off and switching to the hand electric mode of steering control, thereby depriving himself of the computational capabilities of the autopilot. When the hand electric mode is selected, the displays available to the helmsman are signals from a compass, an actual rudder angle indicator and an indicator of the helm angle. The helm angle is continuously adjusted by the helmsman without benefit of the computational capabilities of the autopilot. Although determining the reasonableness of the helm angle is a task suitable for a man, the prior art display systems require him to keep the autopilot off during critical manuvers to prevent an unreasonable rudder angle which may be dangerous. For example, when two ships are moving close to each other, a temporay malfunction of an autopilot could cause a rudder angle which would result in a collision. Such a malfunction possibly would not be discovered in time to avoid a collision.

The basic design goal is to make the helmsman's task as simple as possible.

To maintain a given heading, a ship control system requires that the optimum helm wheel angle be frequently recalculated and displayed to the operator. Such helm angle calculations will take into account the ship speed, the difference between the actual heading and the ship's desired heading, and the maneuvering characteristics of the ship.

It is desirable to present the helmsman in some usable fashion with a calculated value of optimum helm angle. Two types of displays can be used for this purpose. A pursuit type display will display the calculated optimum value of the quantity being controlled as well as the actual value. A compensatory display is a three position discrete indicator which shows that the quantity being controlled should be changed in one direction, changed in the opposite direction or not changed at all. One example of such a display would be three lights with one light indicating a left turn, another light a right turn and the third light indicating no turn is needed. Neither of these two types of displays will be completely satisfactory by itself. The compensatory display does not give any indication to the operator of the size of change that is required. The pursuit type display is generally not good for indicating both when very large changes in the controlled quantity are needed and when very small changes are needed. A display is needed that will both indicate the size of change that is needed in the controlled quantity and also effectively indicate the required direction of that change regardless of its size.

OBJECTS OF THE INVENTION

It is therefore an object of this invention to display information which will enable the human operator of a machine control system to improve his performance by providing him with the computational capability of an automatic control system.

Another object of this invention is to provide to the human operator of a machine control system the computational capability of an automatic control system without depriving the operator of direct and immediate control over the system he is operating.

A further object of this invention is to provide the helmsman of a ship with the computational capabilities of an autopilot while the helmsman is in direct and immediate control of the ship.

Yet another object of this invention is to provide a device which will display to the helmsman of a ship the optimum control actions as they are calculated by an autopilot.

SUMMARY OF THE INVENTION

This invention is a display system which gives the human operator immediate knowledge of the optimum calculated values of the parameter he is controlling. The disclosed embodiment of this invention is for the steering control of a ship. However, the invention is also applicable to other types of man machine control systems, such as control systems for submarines, aerospace vehicles and industrial equipment.

This system comprises a digital computer which receives inputs from various sources, calculates the optimum helm angle and displays both this calculated angle and the actual helm angle on a display. The input sources for the computer include signals from a water speed indicator, ship's gyrocompass, ordered ship's heading input, helm wheel position sensor and a programming keyboard. The display includes a double dial synchro repeater which has a hairline, a calibrated scale, and two rotating pointers. One of the rotating pointers shows the actual position of the helm wheel and the other pointer shows the optimum position of the helm wheel as calculated by the computer. Also included with the display are a set of three lights with one light indicating that the helm wheel should be turned to port, another light indicating that the helm wheel should be turned to starboard and the third light indicating that the position of the helm wheel is proper. Thus this display system operates as both a pursuit and a compensatory display. In addition to this computer aided hand electric mode of operation, the system will also operate in a conventional autopilot mode. The computer aided hand electric mode is equivalent to the normal hand electric mode in those situations when the display is ignored by the helmsman since the helmsman is in direct control of the ship.

DESCRIPTION OF THE PREFERRED EMBODIMENT

Figure 1:
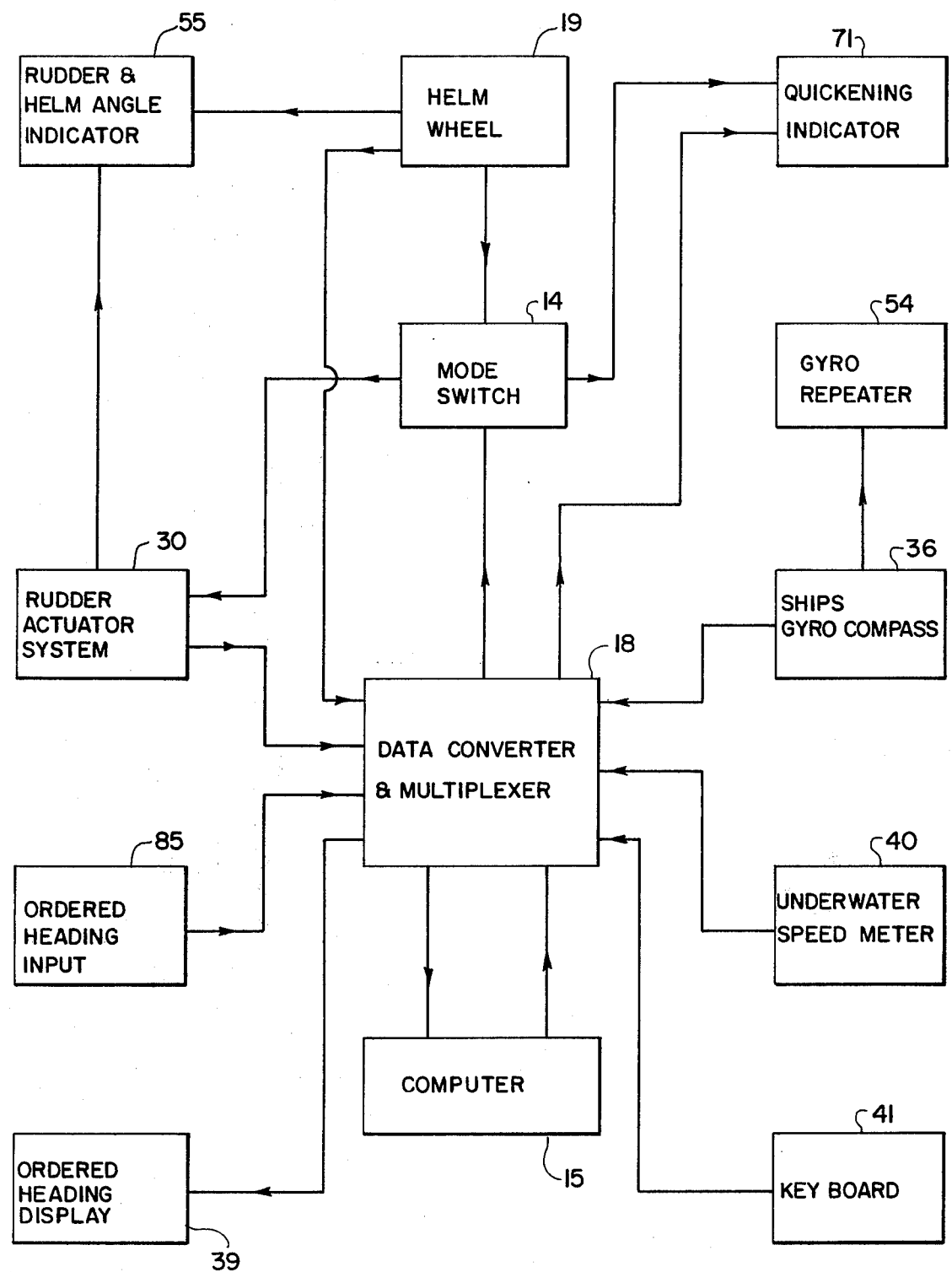
FIG. 1 is a simplified block diagram of the preferred embodiment of a ship control system incorporating the invention.
Figure 3:
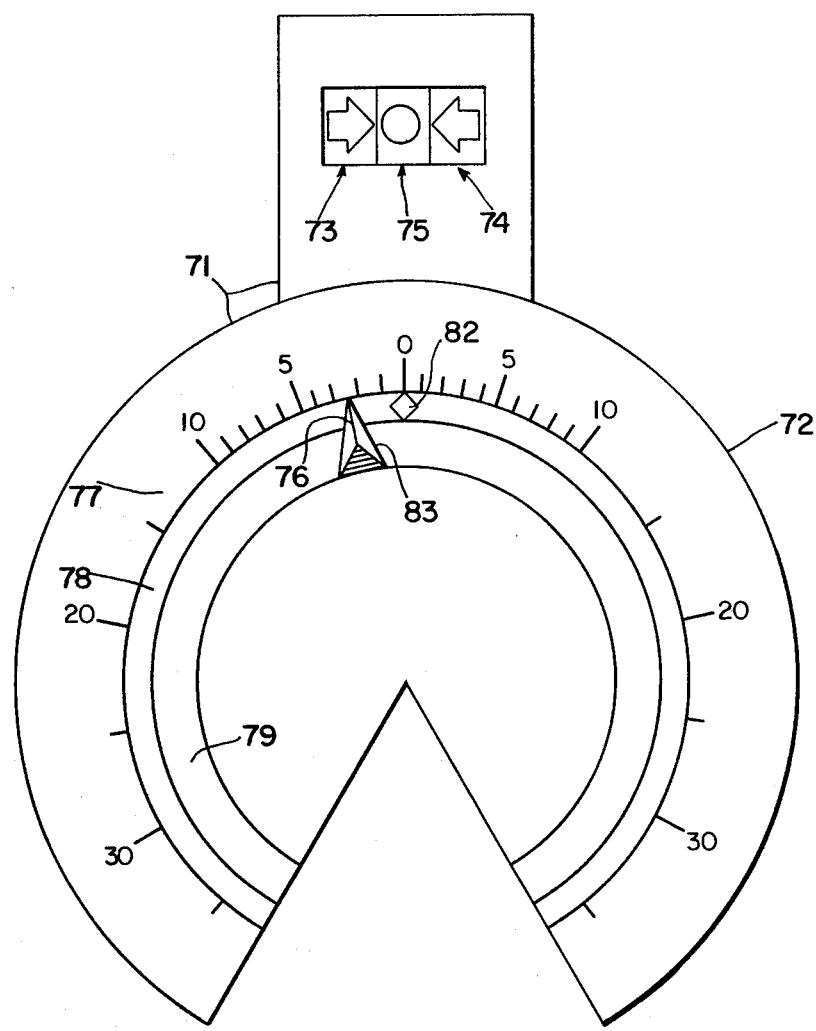
FIG. 3 is a plan view of the preferred embodiment of a double pointer indicator. The same reference numbers are used to refer to the same parts of the invention throughout the several views.

The invention is a steering control system for a ship as shown in the simplified block diagram of FIG. 1. The systems displays include the indicator assembly 71, gyrocompass repeater 54, rudder angle and helm angle indicator 55 and the ordered heading display 39. When the system is in the hand electric or in the computer aided hand electric modes of operation, the helmsman controls the ship directly using the helm wheel 19, which sends signals through the mode switch 14 to the rudder actuator system 30. When the system is in the autopilot mode of operation, the computer 15 controls the rudder directly by sending signals through the data converter and multiplexer 18 and mode switch 14 to the rudder actuator system 30. While the system is in the computer aided hand electric mode of operation, the computer 15 calculates the same optimum rudder angles as it does in the autopilot mode but these calculated angles are sent only to the indicator 71. The computer 15 receives input data from the keyboard 41, underwater speed meter 40, ship's compass 36, rudder control system 30, and ordered heading input switch 85 by way of the data converter and multiplexer 18. The display 71, embodiment, is illustrated by FIG. 3. The indicator assembly 71 comprises a double pointer synchro repeater 72, transilluminated arrow legends 73 and 74, and transilluminated circle legend 75. The double pointer synchro repeater comprises a dial 77, a diamond shaped pointer 82, a trianglular pointer 83, a hairline 76 on the triangular pointer 83, and two concentric rotating rings 78 and 79. The fixed outer dial 77 is graduated in units of rudder angle. The rotating outer ring 78 is attached to the diamond shaped pointer 82. The rotating inner ring 79 is attached to the triangular shaped pointer 83. The position of the steering control mode switch 14 determines the method of operation of the indicator assembly 71. The rotating outer ring 78 is controlled by the digital computer 15, which transmits signals via the data converter and multiplexer 18 to the double pointer synchro repeater 72, which positions the ring 78. When the latch 14 is in the "Hand Electric" position, the position of the rotating inner ring 79 is controlled by the helm wheel 19. When the switch 14 is in the "autopilot" position, the rotating inner ring 79 is controlled by the digital computer 15, which transmits signals via the data converter and multiplexer 18, through switch 14, to the double pointer synchro repeater 72, which positions the ring 79.

The transilluminated legends 73, 74, and 75 are turned on and off by the digital computer 15, which transmits signals via the data converter and multiplexer 18. The compute 15 calculates the optimum value of rudder angle at a frequency so high as to appear to an unaided human observer to be continuous. That value is displayed to the human operator by positioning the rotating ring 78 and diamond shaped pointer 82 with respect to the fixed dial 77.

When the switch 14 is in the "Hand Electric" position, the task of the human operator is to align the triangle on ring 79 with the diamond on ring 78. The three transilluminated legend lights 73, 74, and 75 are used as a digital vernier to assist the operator in interpreting the analog synchro repeater 72. Circle legend 75 is turned on and the other legends 73 and 74 are turned off when the operator has correctly positioned the helm wheel 19. Arrow legends 73 or 74 are turned on as apropriate to indicate the direction in which the operator must move the helm wheel 19 to produce the proper value of ordered rudder angle. Ordered rudder angle may be required to vary continuously and is used as the set point for a separate feedback control system which attempts to make the actual rudder angle match the ordered rudder angle.

Figure 2:
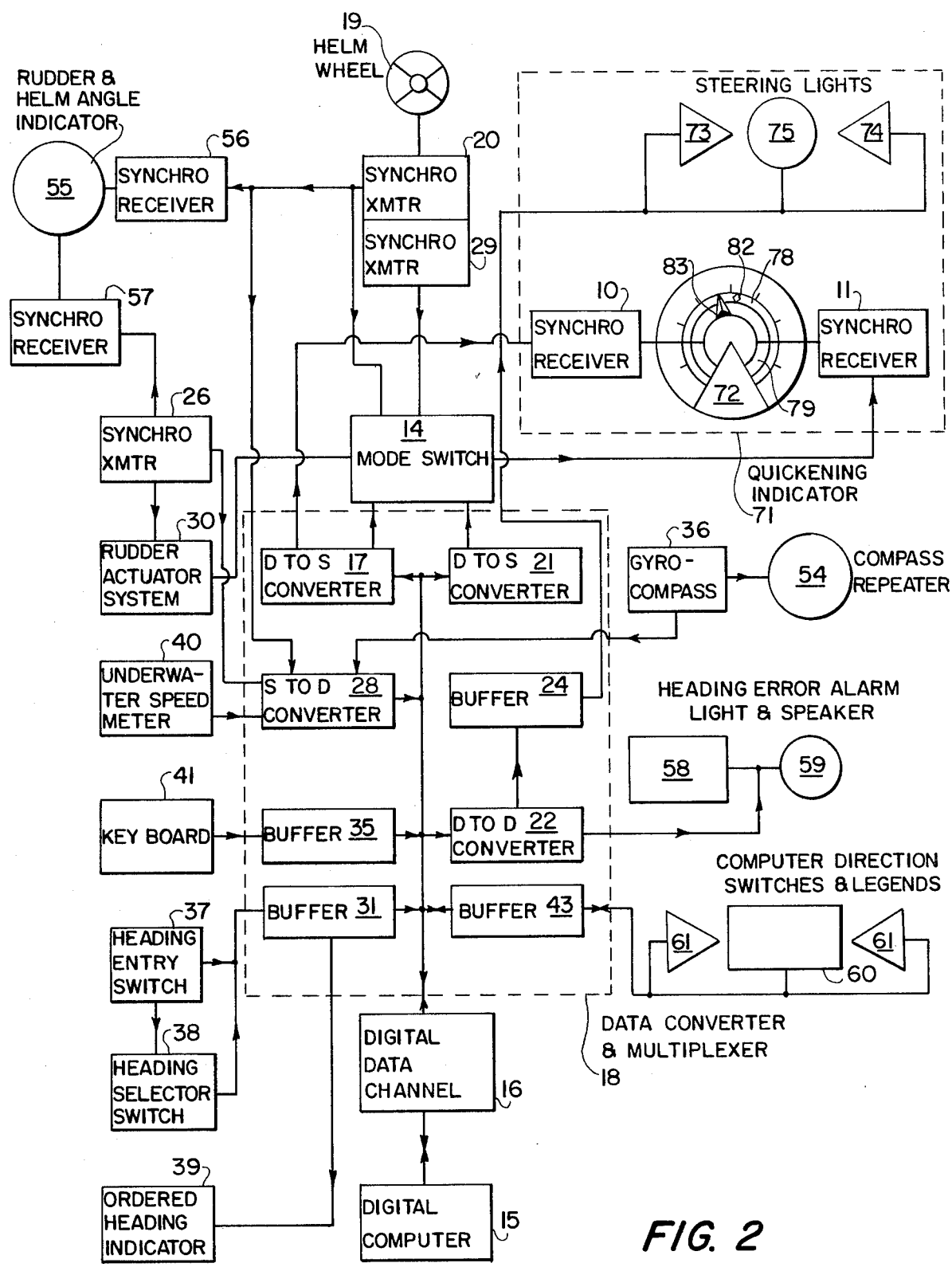
FIG. 2 is a detailed block diagram of the system shown in FIG. 1.

Referring now to the more detailed block diagram of FIG. 2, the rotating outer ring 78 is positioned by synchro receiver 10 which receives signals from the computer 15 by way of digital data channel 16, and digital to synchro converter 17. The rotating inner ring 79 is positioned by synchro receiver 11. When the system is in the hand electric mode, synchro transmitter 20 on the helm wheel 19 transmits a signal through mode switch 14 to synchro receiver 11 which positions the ring 79. When the system is in the autopilot mode, the synchro receiver 11 or ring 79 receives its positioning signals from the computer 15 by way of data channel 16, digital to synchro converter 21 and mode switch 14. The transilluminated legends 73, 74, and 75 receive their signals from the computer 15 by way of digital data channel 16, digital to digital converter 22 and buffer 24.

The ordered rudder angle produced by the helm wheel and the gyrocompass heading are used by the digital computer 15 to determine the optimum value of rudder angle to be displayed via the rotating ring 78. A gyrocompass 36 and synchro transmitter 20, mechanically attached to the helm wheel 19, transmit signals to the digital computer 15 via synchro to digital converters 28 located in the data converter and multiplexer 18 and via digital data channel 16 to the computer 15. Synchro transmitter 29 which is mechanically connected to the helm wheel 19 transmits signals via switch 14 to the rudder actuator system 30. The output of 29 is identical to the output of synchro transmitter 20, which is used to position the rotating inner ring 79. While in the computer aided hand electric mode of operation, the rudder actuator system 30 attempts to make the actual rudder angle equal to the ordered rudder angle from the helm wheel. Legend indicators 73, 74, and 75 show the human operator when the helm wheel is correctly positioned and, when it is not correctly positioned, the direction in which the move it to make it so.

As the terms are used in this specification and in the accompanying claims, helm angle and ordered rudder angle are the same parameter but the actual rudder angle will often be different from helm angle or ordered rudder angle. A transducer attached to the helm wheel produces signals which are representative of the position of the wheel. When these signals are properly calibrated, they will give the value of helm angle or ordered rudder angle. These signals are fed to the rudder control servo system which attempts to make the actual physical angle of the rudder equal to the ordered rudder angle. The helm angle or ordered rudder angle can be changed very rapidly but the actual rudder angle usually cannot be changed by the rudder servo system any faster than about 3° per second. Therefore the actual rudder angle will usually lag behind the helm angle when the helm angle is being changed.

Additional wiring, timing circuits, power supplies and mechanical supports and enclosures well known in the art are required for proper operation of this invention.

Computer direction switches 34 are also used by the operator to cause the computer 15 to change the method of calculating the optimum value of helm angle. For instance, ships are not normally turned at the maximum possible rate because of the adverse effects of high turning rates on such factors as speed, fuel economy and crew comfort. However, in emergency situations such as collision avoidance, the maximum turn rate may be required and desirable. Therefore, two or more sets of equations are provided for use by the computer 15 in calculating the optimum value of rudder angle. The selection of equations to be used are made by means of the computer direction switches 34, the computer direction buffer 43 and the digital data channel 16.

Alarm legend light 58 and audible signal generator 59 are turned on or off by the computer 15, acting through data channel 16 and legend light digital-to-digital converter 22. Alarm legend light 58 and audible signal generator 59 are turned on when the computer 15 calculates that the error between the ordered heading reference stored in buffer 31 and the actual heading obtained from gyrocompass exceeds a predetermined value. This predetermined value may be changed from time to time by the operator using the keyboard 41.

Illuminated pushbutton computer direction switch 60 and computer direction arrow legends 61 are used to notify the operator of an important heading reference recommendation by the computer. The computer 15 determines that a new ordered heading reference is appropriate and transmits signals via data channel 16 and computer direction buffer 43, causing the illumination of computer direction switch 60 and the flashing of the appropriate right or left arrow legend 61. The operator observes the flashing and, when the momentary contact switch 60 is depressed by the operator, a signal is sent to the computer 15 via buffer 43 and data channel 16. The computer responds by changing the method of calculation of the optimum value of rudder angle, if appropriate, and by transmitting signals via data channel 16 and buffers 43 and 31 which cause the illumination of switch 60 and arrow legend 61 to become steady and cause the digital indicators 39 and 53 to display the value of ordered heading determined by the computer 15 and stored in the buffer 31 to be displayed. If mode switch 14 is in the "Hand Electric" position, the operator responds by turning the helm wheel in the direction indicated by the arrow 61 and thereafter by using the indicator assembly 71 which is being driven by the computer 15 in response to the new heading reference stored in buffer 31. If the mode switch 14 is in the "Autopilot" position, the rudder is controlled by the computer 15 in response to the new heading reference stored in buffer 31. When the steadily-illuminated switch 60 is depressed by the operator, a signal is transmitted to the computer 15 via buffer 43 and data channel 16. Computer 15 responds by changing the method of calculating optimum helm angle to that previously directed by means of the keyboard 41 and by transmitting signals via channel 16 and buffers 31 and 43, causing the illumination of switch 60 and legend 61 and to be turned off and causing the output of the heading reference switch 38 to be strobed into buffer 31.

This invention provides for using the capabilities of a computer in a ship control system while at the same time maintaining the helmsman in direct and immediate control of the ship. This system is particularly useful where the dynamics of the system are such that the apparent response of the system to control actions is delayed. By its nature, this system is most appropriate where the consequences of the operator's actions are not immediately reflected in the behavior of the system, but rather have a delayed effect, frequently delayed by reason of the dynamics of the overall system.

This invention makes it possible to simultaneously display on a common scale of a double pointer indicator the output of an automatic control system and the actual value of the quantity being controlled by a human operator. The human operator may or may not accept the recommendations of the automatic control system which are displayed on the double pointer indicator. If the operator does want to accept the recommendations of the automatic control system, the display indicates which direction he should move his controls. While the operator is accepting the recommendations of the automatic control system, his task is no more complicated than that of a simple amplifier since the control system is doing all of the calculations for him.

The system makes use of a pursuit type display to show the size of the changes in the controlled parameter. The system makes use of the compensatory display to show when a correction in the controlled parameter is needed and the direction in which it should be corrected. The compensatory display is most useful in those situtations where the required amount and direction of change in the controlled parameter is so small that it is not readily apparant on the pursuit display. In the preferred embodiment of this invention which is used to control a ship, the compensatory display has a dead band of variable size. At low ship speeds the rudder is relatively ineffective and therefore a rudder movement will not cause the ship to turn unless the rudder is moved over a large angle. At high ship speeds the rudder is very effective and even a small change in rudder angle will cause the ship to turn. Therefore, at low ship speeds a larger change in the calculated rudder angle will be needed to trigger the turn indicator on the compensatory display than will be required at high ship speeds. This variable width dead band minimizes the number of unnecessary and ineffective rudder movements which would help to wear out the rudder mechanism. Another function of the dead band is to cause the compensatory display to ignore and not present to the operator any difference between the actual rudder angle and optimum rudder angle which is not a significant one. For example, large waves will cause a small cyclic motion of the rudder and the heading of the ship. The helmsman ordinarily does not need to turn the helm wheel every time a wave causes such movements because the movements tend to cancel each other out.

Conventional autopilots do not normally make use of the full maneuvering capabilities of a ship. Maximum rudder angle limits and other constraints are usually imposed to limit the consequences of a sudden aberration and to prevent sudden angles of heel generated by strong turning moments. Most of the time, warships do not require more than can be asked of a conventional autopilot, but, when the full maneuvering capabilities of the ship are required, the autopilot must be turned off, thereby depriving the helmsman of the computational capabilities which are so useful. This invention provides means to use the autopilot as selected by the operator, in more than one mode. One example of this may be a conventional mode and another may be a high performance mode in which the calculation of rudder angle is carried out in such a way as to make full use of the ship's inherent maneuvering capabilities. The high performance mode might be used in avoiding obstacles, attacking a target, or maneuvering at high speeds in restricted enemy waters under fire.

The indicator assembly 71 may be comprised of the transilluminated legends 73, 74, and 75 only, or of legends 73 and 74 only, or of the double-dial synchro repeater 72 only. The indicator assembly 71 may be duplicated pictorially on a pictorial display such as a cathode ray tube with a symbol generator or a digital television. The invention may contain a plurality of such assemblies 71 in any of their permutations and combinations. The double dial synchro repeater 72 may have different orientation, dial shapes or scales from that illustrated by FIG. 3. The directions of arrow legends 73 and 74 may be reversed with respect to circle legend 75. Legends 73, 74, and 75 may be oriented differently with respect to repeater 72 and the horizontal. Legends 73, 74, 75, 58, and 61 are generic components available in a variety of materials and constructions such a mechanical drops, light emitting diodes, and plastic films transilluminated by tungsten lamps through colored filters.

The fixed outer dial 77 is graduated in units of the quantity being controlled, which may be other than rudder angle, depending on the application. Different ratios of display angle to helm angular travel and rudder angular travel may be used. The dial may be oriented differently with respect to the operator and the helm 19. The dial may be of a different shape, as appropriate to the motions of the helm 19. The dial 77 may, for instance, be rectangular in shape if the motions of the helm 19 are linear rather than circular. The rotating outer ring 78 and rotating inner ring 79 may be provided with different shapes and ratios of movement to the movements of the helm 19 and of the quantity being controlled.

Although the preferred embodiment includes synchro receivers, numerous devices such as galvanometers, stepping motors and hydraulic motors may be substituted for the outer and inner ring synchro receivers 10 and 11. Numerous shapes and color codes are possible for the pointer marks 82 and 83.

The computer 15 may be a general purpose digital computer as in the preferred embodiment or it may be conventional analog autopilot. The helm wheel 19 is generic and may take the form of levers, knobs, knobs with handles, wheels or wheels with handles. Gyrocompass 36 is a specific example of a generic means for measuring the actual value of the variable which the system is attempting to control. Numerous measuring means may be selected, depending on the nature of the quantity being controlled. For surface vehicle steering control, magnetic compasses, inertial navigation systems, radio homing systems, or radars are all appropriate under certain circumstances. If the system is applied to control other than that for surface vehicle steering, such as submarine depth control, the measuring means may take the form of a pressure transducer. If the display system is applied to control of industrial machinery, the measuring means may take the form of displacement or proximity transducers, for instance.

Almost every hardware component of the preferred embodiment is available from suppliers in accordance with the various military specifications and standards normally applicable to ship control of a U.S. Navy warship. For instance, the double-dial synchro repeater is covered by MIL-I-15676 and is in use with different dial markings and for a different purpose in every U.S. Navy antisubmarine warfare surface ship.

Obviously many modifications and variations of this invention are possible in the light of the above teachings. It is therefore to be understood that within the scope of the appended claims the invention may be practiced otherwise than as specifically described.

What is claimed is:

1. An automated system for assisting a human operator to adjust a machine control parameter in an optimal manner comprising;

a computing means for repetitively calculating an optimum ordered value of the control parameter;

sensor means for providing the computing means with the data needed to calculate the control parameter;

control means adjustable by the operator to directly and continuously set an ordered value of the control parameter;

a display means, including a compensatory display and a pursuit display, for continuously presenting to the operator the most recently calculated optimum ordered value of the control parameter, the ordered value of the control parameter set by the operator, and the direction and significance of the error between the optimum ordered value and the set ordered value of the control parameter;

said compensatory display including three indicators with each of the indicators having an excited state and an off state, an excited state on one indicator indicating that the calculated optimum ordered value of the control parameter is larger than the set ordered value, an excited state on a second indicator indicating that the calculated optimum ordered value of the control parameter is smaller than the set ordered value, and an excited state on the third indicator indicating that the difference between the set ordered and the calculated optimum ordered values of the control parameter is not significant, only one of the three indicators being exited at a time;

said pursuit display including a calibrated dial with two cursors movable along the dial, with the position of one cursor indicating the calculated optimum ordered value of the control parameter and the position of the other cursor indicating the set ordered value of the control parameter.

2. The system of claim 1 wherein:

said machine control parameter is the rudder angle of a ship control system;

said sensor means include a means for determining the ship's actual heading, means for determining the ship's helm angle, means for acquiring and storing the value of ordered ship's heading, and means for said operator to enter instructions and numerical constants into said computing means; said control means is a ship's helm wheel.

3. An automated system for assisting a human operator to control the helm angle of a ship control system comprising:
computing means to repetitively calculate an optimum value of said helm angle;
sensor means to provide said computing means with the data needed to calculate said helm angle, said sensor means including means for measuring the ship speed and the ship's actual heading, means for acquiring and storing the ordered value of ship heading and means for said operator to enter instructions and numerical constants into said computing means;
a control means adjustable by said operator to maintain direct and continuous control over said helm angle; and
a display means which continuously presents to said operator the optimum value of said helm angle most recently calculated by said computing means and which also presents the value of said helm angle determined by said control means.

4. An apparatus for assisting a human operator to control the helm angle of a ship control system comprising:
computing means for repetitively calculating optimum values of said helm angle;
sensor means for providing said computing means with the data needed to calculate said helm angle; said sensor means including means for measuring the ship's speed, and ship's actual heading, means for said operator to enter instructions and numerical constants into said computing means;
a control means adjustable by said operator to maintain direct and continuous control over said helm angle, said control means including a ship helm wheel which provides values of ordered rudder angle;
a display means which continuously presents to said operator the optimum value of said helm angle most recently calculated by said computing means, the value of said ordered rudder angle provided by said helm wheel, and the direction in which said helm wheel should be moved to cause the ordered rudder angle to equal the calculated optimum helm angle.

5. The apparatus of claim 4 wherein said display means includes a double dial synchro repeater for displaying the calculated optimum helm angle and the ordered rudder angle and three lights which may be energized to indicate whether the helm wheel should be turned and which direction it should be turned.

6. The apparatus of claim 4 further comprising:
a rudder angle indicator which displays to said operator the angular position of the ship's rudder;
a compass repeater which displays to said operator the actual heading angle of said ship;
a heading error alarm which attracts the operator's attention whenever the difference between the ship's actual heading and the ship heading desired by the operator exceeds a preset value.

7. A system for assisting a helmsman steering a ship comprising:
a helm wheel which is positioned by the helmsman and which provides an ordered rudder angle to a rudder actuator system;
a computer which repetitively calculates an optimum helm angle for the ship;
a plurality of sensors to provide said computer with data needed to calculate said optimum helm angle, said sensors including a gyrocompass, an underwater speed meter, and an ordered heading entry switch;
a display device which shows the helmsman both the value of optimum helm angle most recently calculated by said computer and the value of ordered rudder angle provided by said helm wheel to said rudder actuator system.

8. The system of claim 7 wherein said display device includes a double dial synchro repeater for displaying the calculated optimum helm angle and the ordered rudder angle and three lights which may be energized to indicate whether the helm wheel should be turned and which direction it should be turned.

9. A system for assisting a human operator to adjust, in an optimal manner, the ordered value of an output parameter of a ship motion control device, comprising:
computing means for repetitively calculating an optimum ordered value of a ship motion control device output parameter;
sensor means for providing the computing means with the data needed to calculate the optimum ordered value;
control means adjustable by the operator for directly and continuously setting an ordered value of the output parameter;
display means for continuously presenting to the operator the most recently calculated optimum ordered value of the output parameter, the ordered value of the output parameter set by the operator using the control means, and the direction and significance of the error between the optimum ordered value and the set ordered value.

10. The system of claim 9 further comprising servo means for adjusting the actual value of the output parameter to be equal to the ordered value set by the operator using the control means.

11. The system of claim 10 wherein said display means comprises:
a compensatory display means including three indicators with each of the indicators having an excited state and an off state, an excited state on one indicator indicating that the calculated optimum ordered value of the output parameter is larger than the set ordered value, an excited state on a second indicator indicating that the calculated optimum ordered value of the output parameter is smaller than the set ordered value, and an excited state on the third indicator indicating that the difference between the set and the calculated optimum ordered values of the output parameter is not significant, only one of the three indicators being exited at a time;
a pursuit display means including a calibrated dial with two cursors movable along the dial, with the position of one cursor indicating the calculated optimum ordered value of the output parameter and the position of the other cursor indicating the set ordered value of the output parameter.

12. The system of claim 10 wherein said sensor means include a means for measuring the ship's speed, the ship's actual heading, and the actual value of the output parameter, means for acquiring and storing the value of ship's heading ordered by the operator, and means for said operator to enter instructions and numerical constants into said computing means.

13. The system of claim 9 wherein said ship motion control device output parameter is the angular position of the ship's rudder relative to the ship.

14. The system of claim 13 wherein said display means comprises:
   a compensatory display means including three indicators with each of the indicators having an excited state and an off state, an excited state on one indicator indicating that the calculated optimum ordered value of the output parameter is larger than the set ordered value, an excited state on a second indicator indicating that the calculated optimum ordered value of the output parameter is smaller than the set ordered value, and an excited state on the third indicator indicating that the difference between the set and the calculated optimum ordered values of the output parameter is not significant, only one of the three indicators being exited at a time;
   a pursuit display means including a calibrated dial with two cursors movable along the dial, with the position of one cursor indicating the calculated optimum ordered value of the output parameter and the position of the other cursor indicating the set ordered value of the output parameter.

15. The system of claim 13 wherein said sensor means include a means for measuring the ship's speed, the ship's actual heading, and the actual value of the output parameter, means for acquiring and storing the value of ship's heading ordered by the operator, and means for said operator to enter instructions and numerical constants into said computing means.

16. The system of claim 9, wherein said display means comprises:
   a compensatory display means including three indicators with each of the indicators having an excited state and an off state, an excited state on one indicator indicating that the calculated optimum ordered value of the output parameter is larger than the set ordered value, an excited state on a second indicator indicating that the calculated optimum ordered value of the output parameter is smaller than the set ordered value, and an excited state on the third indicator indicating that the difference between the set and the calculated optimum ordered values of the output parameter is not significant, only one of the three indicators being exited at a time;
   a pursuit display means including a calibrated dial with two cursors movable along the dial, with the position of one cursor indicating the calculated optimum ordered value of the output parameter and the position of the other cursor indicating the set ordered value of the output parameter.

17. The system of claim 9 wherein said sensor means includes a means for measuring the ship's speed, the ship's actual heading, and the actual value of the output parameter, means for acquiring and storing the value of ship's heading ordered by the operator, and means for said operator to enter instructions and numerical constants into said computing means.

* * * * *